(12) United States Patent
Zhang et al.

(10) Patent No.: US 12,189,281 B2
(45) Date of Patent: Jan. 7, 2025

(54) PROJECTION DEVICE HAVING LIGHT SOURCE ARRAY AND COLOR WHEEL

(71) Applicant: Qisda Corporation, Taoyuan (TW)

(72) Inventors: Jia-Ming Zhang, Taoyuan (TW); Yi-Ling Lo, Taoyuan (TW); Ching-Tze Huang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/369,916

(22) Filed: Sep. 19, 2023

(65) Prior Publication Data
US 2024/0134261 A1 Apr. 25, 2024
US 2024/0231210 A9 Jul. 11, 2024

(30) Foreign Application Priority Data

Oct. 19, 2022 (CN) .......................... 202211280241.7

(51) Int. Cl.
*G03B 21/20* (2006.01)

(52) U.S. Cl.
CPC ....... *G03B 21/204* (2013.01); *G03B 21/2013* (2013.01)

(58) Field of Classification Search
CPC ............ G03B 21/2013; G03B 21/2033; G03B 21/204; G02B 26/008; F21V 9/40; F21V 14/08
See application file for complete search history.

(56) References Cited

U.S. PATENT DOCUMENTS

| | | | |
|---|---|---|---|
| 6,207,946 B1* | 3/2001 | Jusoh | G01N 21/8806 250/559.34 |
| 6,222,172 B1* | 4/2001 | Fossum | G01J 1/08 250/228 |
| 6,618,031 B1* | 9/2003 | Bohn, Jr. | G09G 3/20 345/82 |
| 6,930,759 B2* | 8/2005 | Roddy | G03B 27/547 347/255 |
| 7,547,114 B2* | 6/2009 | Li | G03B 21/206 362/555 |
| 8,106,608 B2* | 1/2012 | Ku | H05B 45/10 315/360 |
| 8,596,815 B2* | 12/2013 | Lee | G02B 21/16 362/249.02 |
| 8,840,253 B2* | 9/2014 | Kitano | G03B 21/204 348/339 |
| 9,456,188 B2* | 9/2016 | Miyata | G03B 21/16 |
| 9,644,803 B2* | 5/2017 | Kasugai | G02B 27/48 |
| 9,869,856 B2* | 1/2018 | Inoue | G03B 21/206 |
| 9,927,685 B2* | 3/2018 | Liao | G03B 21/204 |

(Continued)

*Primary Examiner* — Ismael Negron

(57) ABSTRACT

A projection device includes a plurality of solid-state lighting sources driven by a DC drive power to sequentially provide a first light generated by a first number of light sources, a second light generated by a second number of light sources and a third light generated by a third number of light sources within a response cycle; and a color wheel having a first block, a second block and a third block, respectively corresponding to the first to third lights, so that the projection device sequentially outputs a first color light with a first brightness, a second color light with a second brightness and a third color light with a third brightness. The brightness of the first to third lights is controlled by number of light sources to be turn on.

19 Claims, 9 Drawing Sheets

(56) References Cited

U.S. PATENT DOCUMENTS

| | | | |
|---|---|---|---|
| 9,946,142 B2* | 4/2018 | Miyata | G03B 21/204 |
| 9,992,832 B2* | 6/2018 | Weiss | H05B 45/48 |
| 10,809,607 B2* | 10/2020 | Fan | G03B 21/208 |
| 11,378,876 B2* | 7/2022 | Guo | G03B 21/2066 |
| 11,785,693 B2* | 10/2023 | Ogawa | G02B 27/1033 |
| | | | 353/85 |
| 2014/0253882 A1* | 9/2014 | King | G02B 26/008 |
| | | | 353/31 |
| 2017/0082912 A1* | 3/2017 | Wakabayashi | G03B 21/2013 |
| 2023/0110183 A1* | 4/2023 | Takano | G03B 21/2066 |
| | | | 353/102 |

\* cited by examiner

PROJECTION DEVICE HAVING LIGHT SOURCE ARRAY AND COLOR WHEEL

This application claims the benefit of People's Republic of China application Serial No. 202211280241.7, filed Oct. 19, 2022, the subject matter of which is incorporated herein by reference.

BACKGROUND OF THE INVENTION

Field of the Invention

The invention relates in general to a light source system, and more particularly to a projection device.

Description of the Related Art

Generally speaking, the Laser projector provides a lighting beam using a blue Laser light source. The lighting beam needs to be converted to an excited beam of other colors by a wavelength conversion element, and then the excited beam is combined with the lighting beam. According to the commonly used method for controlling the brightness of a Laser light source, the pulse width (period of time) of the voltage provided to the Laser light source is adjusted by the signal provided by a pulse width modulator (PWM), so that the drive current varies with the supply voltage. The wider the pulse width of the supply voltage, the higher the brightness of the Laser light source. Conversely, narrower the pulse width of the supply voltage, the lower the brightness of the Laser light source.

However, as the pulse width is narrowed, the brightness control circuit using PWM must change the drive current at a faster speed, making the brightness of the light source unable to be correspondingly reduced. Since the brightness control circuit has an increased difficulty in terms of design and needs to bear a larger load, the cost of the brightness control circuit increases.

SUMMARY OF THE INVENTION

The present disclosure relates to a projection device, which drives solid-state lighting sources with a DC drive power instead of changing the drive current using a pulse width modulator, so that image quality can be increased.

According to one embodiment of the present invention, a projection device, including a light source module and a color wheel, is provided. The light source module includes a plurality of solid-state lighting sources driven by a DC drive power to sequentially provide a first light generated by a first number of light sources, a second light generated by a second number of light sources and a third light generated by a third number of light sources within a response cycle, wherein a number of light sources to be turned on is less than or equivalent to the total number of solid-state lighting sources. The color wheel has a first block, a second block and a third block, respectively corresponding to the first light, the second light and the third light, so that the projection device sequentially outputs a first color light with a first brightness, a second color light with a second brightness and a third color light with a third brightness.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention.

Figure 1:
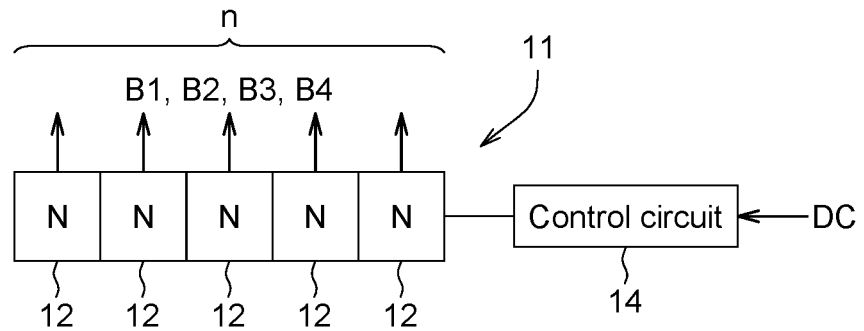
FIG. 1 is a schematic diagram of a light source module of a projection device according to an embodiment of the present invention.
Figure 2A:
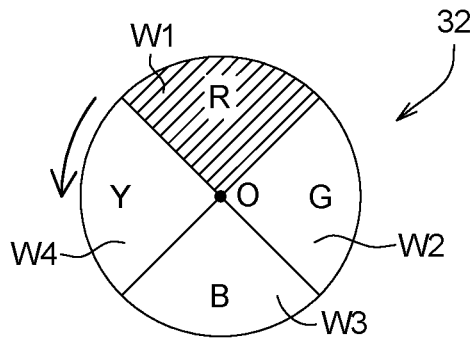
FIGS. 2A-2D respectively are schematic diagrams of a color wheel of a projection device according to an embodiment of the present invention.
Figure 2B:
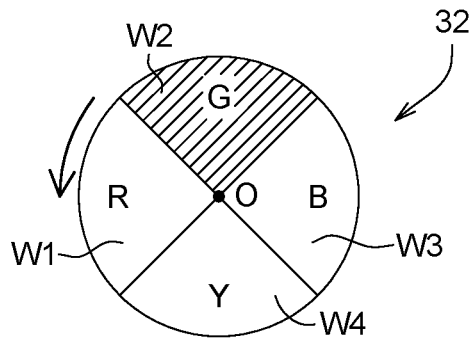
Figure 2C:
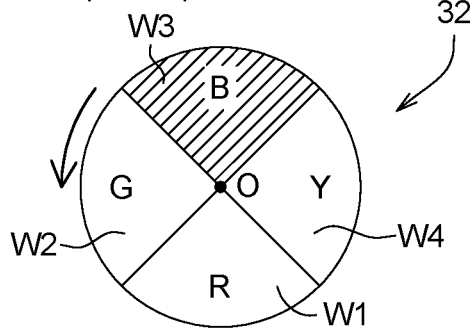

Refer to FIG. 1 and FIG. 2A to FIG. 2C. FIG. 1 is a schematic diagram of a light source module 11 of a projection device according to an embodiment of the present invention. FIGS. 2A-2C respectively are schematic diagrams of a color wheel 32 of a projection device according to an embodiment of the present invention.

The projection device includes a light source module 11 and a color wheel 32. The light source module 11 includes a plurality of solid-state lighting sources 12 driven by a direct-current drive power DC to sequentially provide a first light B1 generated by a first number of light sources, a second light B2 generated by a second number of light sources and a third light B3 generated by a third number of light sources within a response cycle, wherein the number of light sources is less than or equivalent to the number of solid-state lighting sources (that is, the sum of all solid-state lighting sources). The number of light sources to be turned on is such as 20, 40, 60, 80 or 100, and the total number of solid-state lighting sources is such as 100. The number of solid-state lighting sources 12 is the sum of all light sources, the number of light sources in each group of solid-state lighting sources 12 is N, such as 20 or other numbers. By turning on a group of solid-state lighting sources 12, N light sources are obtained; by turning on two groups of solid-state lighting sources 12, 2N light sources are obtained; and the rest can be obtained by the same analogy. The color wheel 32 has a first block W1, a second block W2 and a third block W3 respectively corresponding to the first light B1, the second light B2 and the third light B3, so that the projection device (referring to FIG. 5A and FIG. 6A) sequentially outputs a first color light with a first brightness R, a second color light G with a second brightness and a third color light B with a third brightness.

As indicated in FIG. 1, the light source module 11 includes, for example, n groups of solid-state lighting sources 12, wherein n can be exemplified by 5, and the solid-state lighting sources 12 form a solid-state lighting source array, such as a Laser array or a light-emitting diode (LED) array. Each group of solid-state lighting sources 12 includes, for example, a predetermined number of light-emitting devices, such as a 4×4 array or a 4×5 array, wherein the first light B1 corresponds to the first number of light sources (such as 100 or 80), the second light B2 corresponds to the second number of light sources (such as 60 or 40), the third light B3 corresponds to the third number of light sources (such as 40 or 20), and adjustment can be made depending on actual needs. Each group of solid-state lighting sources 12 may include a drive circuit (not illustrated) driven by a direct-current drive power DC. The drive circuits are respectively connected to a control circuit 14, which controls the ON/OFF state of individual drive circuit according to the number of light sources that the system requires. Thus, the light source module 11 can provide a first light B1, a second light B2 and a third light B3 generated by different numbers of light sources according to actual needs.

The first light B1, the second light B2, the third light B3 are such as blue lights or other color lights. The first number of light sources, the second number of light sources, and the third number of light sources can be identical or different, and the present invention does not have specific restrictions regarding the said arrangement.

Conventionally, the drive current is changed by a pulse width modulator. The light source module 11 of the present embodiment drives the solid-state lighting sources 12 with a fixed direct-current drive power DC (the current is a fixed value), and therefore does not need to change the drive current at a faster speed when the pulse width of the control circuit is narrowed. Since the light source module 11 of the present embodiment changes the number of light sources with respect to different response periods and is easy to control, the design difficulty of the control circuit 14 can be reduced without increasing the load and cost of the control circuit 14.

Refer to FIGS. 2A-2C. the center O of the color wheel 32 has a drive shaft, which drives the color wheel 32 to rotate, so that the first block W1, the second block W2 and the third block W3 of the color wheel 32 respectively correspond to the first light B1, the second light B2 and the third light B3. The first block W1, the second block W2 and the third block W3 are color blocks of different colors, such as red filter film block, green filter film block and blue filter film block. As indicated in FIG. 2A, when the first block W1 (denoted by slashes) of the color wheel 32 correspondingly rotates to the optical path of the light source module 11, the excited beam corresponding to the first light B1 of the first number of light sources irradiates on the first block W1 and forms a first color light R. As indicated in FIG. 2B, when the second block W2 (denoted by slashes) of the color wheel 32 correspondingly rotates to the optical path of the light source module 11, the excited beam corresponding to the second light B2 of the second number of light sources irradiates on the second block W2 and forms a second color light G; As indicated in FIG. 2C, when the third block W3 (denoted by slashes) of the color wheel 32 correspondingly rotates to the optical path of the light source module 11, the reflective beam corresponding to the third light B3 of the third number of light sources irradiates on the third block W3 and forms a third color light B.

Figure 2D:
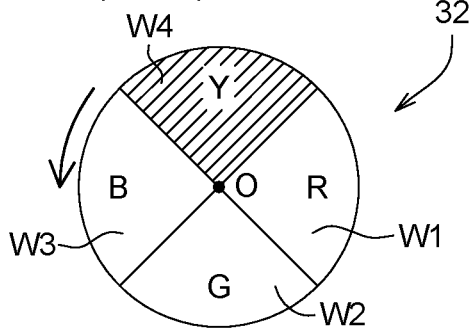

In another embodiment, the solid-state lighting sources 12 can further provide a fourth light B4 generated by a fourth number of light sources, and the color wheel 32 further has a fourth block W4 corresponding to the fourth light B4, so that the projection device 10 outputs a fourth color light Y with a fourth brightness. As indicated in FIG. 2D, when the first block W4 (denoted by slashes) of the color wheel 32 correspondingly rotates to the optical path of the light source module 11, the excited beam corresponding to the fourth light B4 of the fourth number of light sources irradiates on the first block W4 and forms a fourth color light Y. For instance, the first color light R is a red light, the second color light G is a green light, the third color light B is a blue light, and the fourth color light Y is a yellow light. These color lights do not have a sequence and can be adjusted according to actual needs.

Since the first light B1, the second light B2 and the third light B3 are generated by identical or different numbers of solid-state lighting sources 12, the brightness of the first color light R, the brightness of the second color light G and the brightness of the third color light B can be identical or different. Generally speaking, the brightness of each of the color lights R, G, B is positively correlated with the number of corresponding light sources. For instance, within a first response period t1, the excited beam generated by the first number of light sources of the solid-state lighting sources 12 passes through the first block W1 to generate a first color light R with a first brightness. Within a second response period t2, the excited beam generated by the second number of light sources of the solid-state lighting source 12 passes through the second block W2 to generate a second color light G with a second brightness. Within a third response period t3, the reflective beam generated by the third number of light sources of the solid-state lighting source 12 passes through the third block W3 to generate a third color light B with a third brightness. Within a fourth response period t4, the excited beam generated by the fourth number of light sources of the solid-state lighting source 12 passes through the fourth block W4 to generate a fourth color light Y with a fourth brightness. The larger the number of turned-on light sources, the larger the amount of luminous flux emitted within a unit time, and the higher the brightness of the outputted color lights R, G, B, Y. Conversely, the smaller the number of turned-on light sources, the smaller the amount of luminous flux emitted within a unit time, and the lower the brightness of the outputted color lights R, G, B, Y.

Since the areas of blocks W1-W4 are positively correlated with the light outputs of the color lights R, G, B, Y, the light outputs of the color lights R, G, B, Y can be obtained according to the lights B1-B4 generated by the number of light sources and the areas of corresponding blocks W1-W4.

Figure 3A:
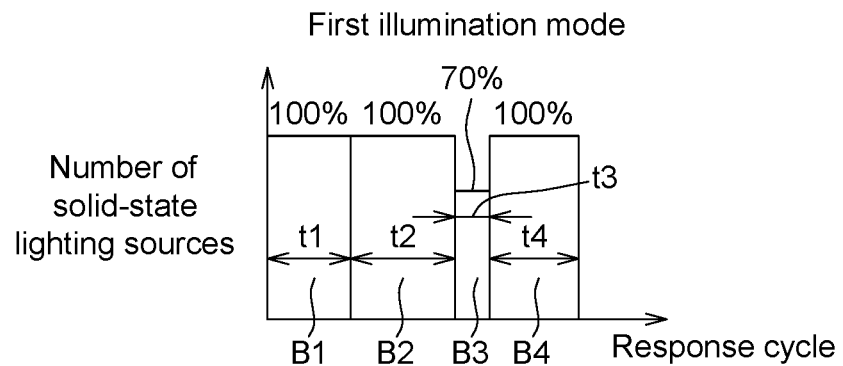
FIGS. 3A-3C respectively are schematic diagrams of the number of solid-state lighting sources vs response period for a light source module in first lighting mode, standard mode and second lighting mode.
Figure 3B:
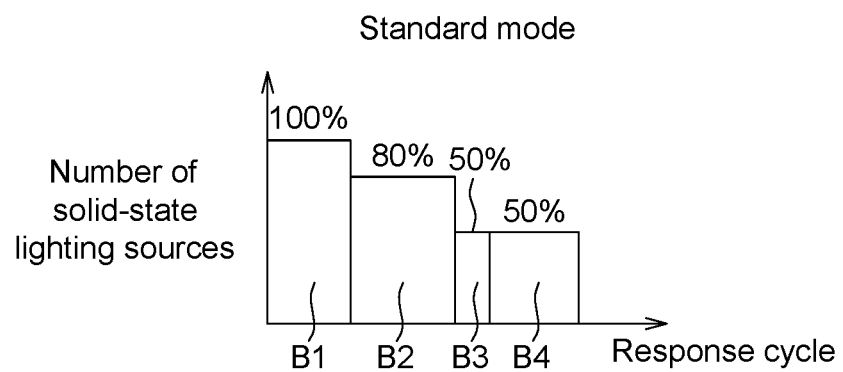
Figure 3C:
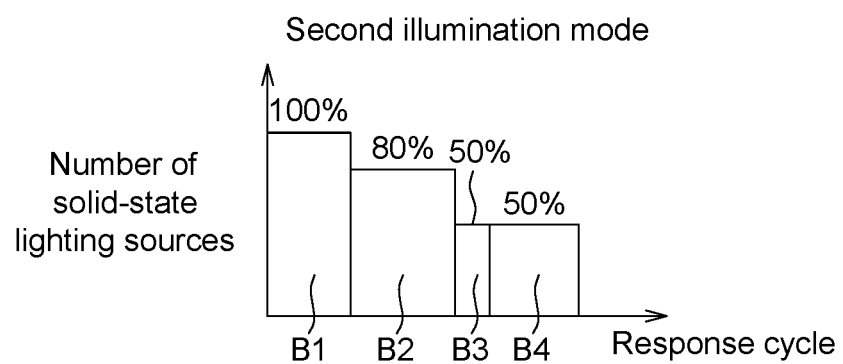

Referring to FIGS. 3A-3C, schematic diagrams of the number of solid-state lighting sources vs response period for a light source module 11 in first lighting mode, standard mode and second lighting mode are respectively shown. The vertical axis represents the number of turned-on solid-state lighting sources, the horizontal axis represents response period, and the area of each straight block corresponds to the block area of each color wheel block or the area of each fluorescent excited color wheel. The light source module 11 sequentially provides corresponding luminous flux within each response period.

As indicated in FIGS. 3A and 3C, the projection device 10 has a first lighting mode and a second lighting mode. The first lighting mode is such as a highlight mode, and the second lighting mode is such as a high color mode. It can be known from FIGS. 3A and 3C that at least a part of the numbers of light sources in the first lighting mode is not the same as in the second lighting mode. In the highlight mode of FIG. 3A, the projection device displays images with high luminance, and this can be achieved by turning on more solid-state lighting sources 12 and setting color temperature to the range of 7500K-9500K. For instance, 100% of the number of solid-state lighting sources for generating the first light B1, 100% of the number of solid-state lighting sources for generating the second light B2, 70% of the number of solid-state lighting sources for generating the third light B3, and 100% of the number of solid-state lighting sources for generating the fourth light B4 are turned on to form a solid-state lighting sources 12 with high luminance. Then, the solid-state lighting sources 12 with high luminance are converted to different color lights using the color wheel 32, so that image colors become clearer and brighter.

In the high color mode of FIG. 3C, the projection device displays images with high saturation, and this can be achieved by turning on different numbers of solid-state lighting sources 12 within different response intervals and setting color temperature to the range of 6500K-7500K. For instance, 100% of the number of solid-state lighting sources for generating the first light B1, 80% of the number of solid-state lighting sources for generating the second light B2, 50% of the number of solid-state lighting sources for generating the third light B3, 50% of the number of solid-state lighting sources for generating the fourth light B4 are turned on to form the solid-state lighting sources 12 with second high luminance. Then, the solid-state lighting source 12 with second high luminance are converted to different color lights by the color wheel 32, so that color saturation is increased, and image colors become brighter.

In the standard mode of FIG. 3B, the color brightness and saturation of the outputted images are between the highlight mode and the high color mode, and color temperature is set to be around 7500K. In order to change the brightness of the outputted images, the brightness of at least one of the first color light R, the second color light G and the third color light B in the first lighting mode is not the same as in the second lighting mode. For instance, at least one of the red light brightness, the blue light brightness and the green light brightness in the first lighting mode is not the same as in the second lighting mode.

Figure 4A:
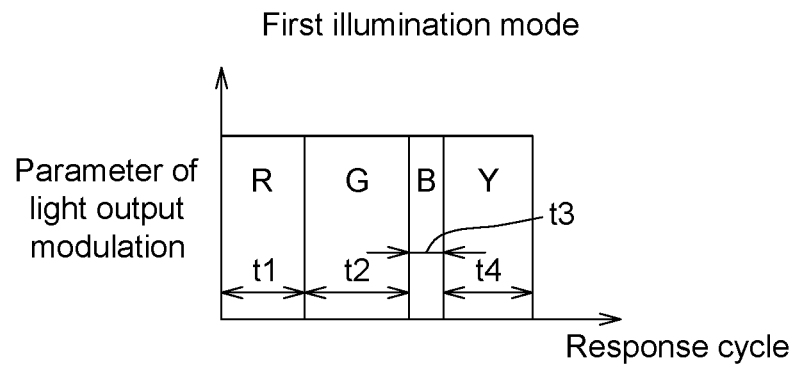
FIGS. 4A-4C respectively are schematic diagrams of the parameter of light output modulation vs response period for a light source module in first lighting mode, standard mode and second lighting mode.
Figure 4B:
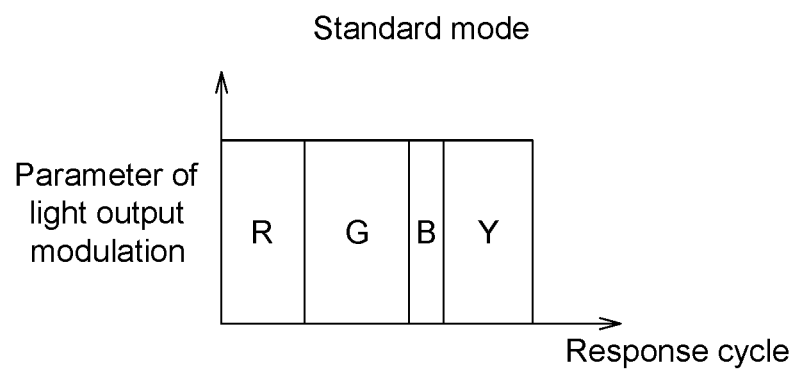
Figure 4C:
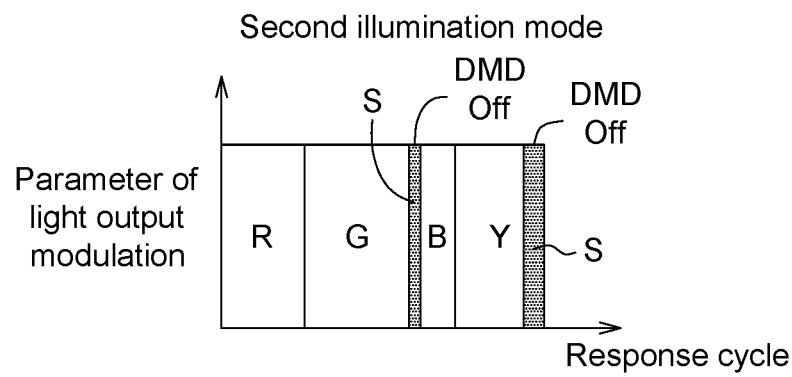

Referring to FIG. 4A-4C, schematic diagrams of the parameter of light output modulation vs response period for a light source module 11 in first lighting mode, standard mode and second lighting mode are respectively shown. The vertical axis represents the parameter of light output modulation when the digital micro mirror device (DMD) is turned on, the horizontal axis represents response period, and the area of each straight block represents the light output of each of the color lights R, G, B, Y, which corresponds to the number of light sources when the light source module is turned on. In gray blocks S of FIG. 4C, the DMD is turned off and the light output is zero, so that the projection device 10 can sequentially adjust the light output of each color light within each response period.

In order to change the color temperature of the outputted images, the high color mode has a first modulation parameter and a second modulation parameter. As indicated in FIGS. 4A and 4C, at least one part of the light outputs of the color lights R, G, B, and Y under the first modulation parameter is not the same as under the second modulation parameter. That is, the light output of at least one of the first color light R, the second color light G and the third color light B of the outputted images is changed due to the modulation of DMD. The DMD is a digitally controlled micro-opto-electro-mechanical system (MOEMS) of spatial light modulator for adjusting the amplitude and direction of incident light.

For instance, the first modulation parameter sets the light to be modulated by the DMD then is outputted; the second modulation parameter sets the light to be modulated by the DMD but is not outputted. Under the first modulation parameter, the micro-lens of digital microscopy device is turned on, at least one of the color lights R, G, B, Y is reflected to the direction of light output by the micro-lens then is outputted, so that the light output of the at least one of the color lights R, G, B, Y is increased. Under the second modulation parameter, the micro-lens of digital microscopy device is turned off, and at least one color light R, G, B, Y is not reflected to the direction of light output, so that the light outputs of the color lights RGBY is decreased. Thus, in the present embodiment, the light output of each of the color lights R, G, B, Y can be changed by adjusting the modulation interval of DMD (gray blocks S of FIG. 4C).

In the present embodiment, the ratio of each color brightness of the outputted images can be changed by adjusting the modulation interval of DMD (gray blocks S of FIG. 4C). For instance, the ratio of the color brightness of the color light with the first brightness (such as red light), the color light with the second brightness (such as green light) and the color light with the third brightness (such as blue light) outputted after DMD modulation to the total brightness of all color lights (such as red light+green light+blue light) generated by the light source module 11 without modulation can be adjusted to obtain the color brightness of different color lights RGB ratios by adjusting the modulation interval of DMD, so that the images displayed by the projection device 10 can be close to the color chroma and the brightness of ideal white balance.

Figure 5A:
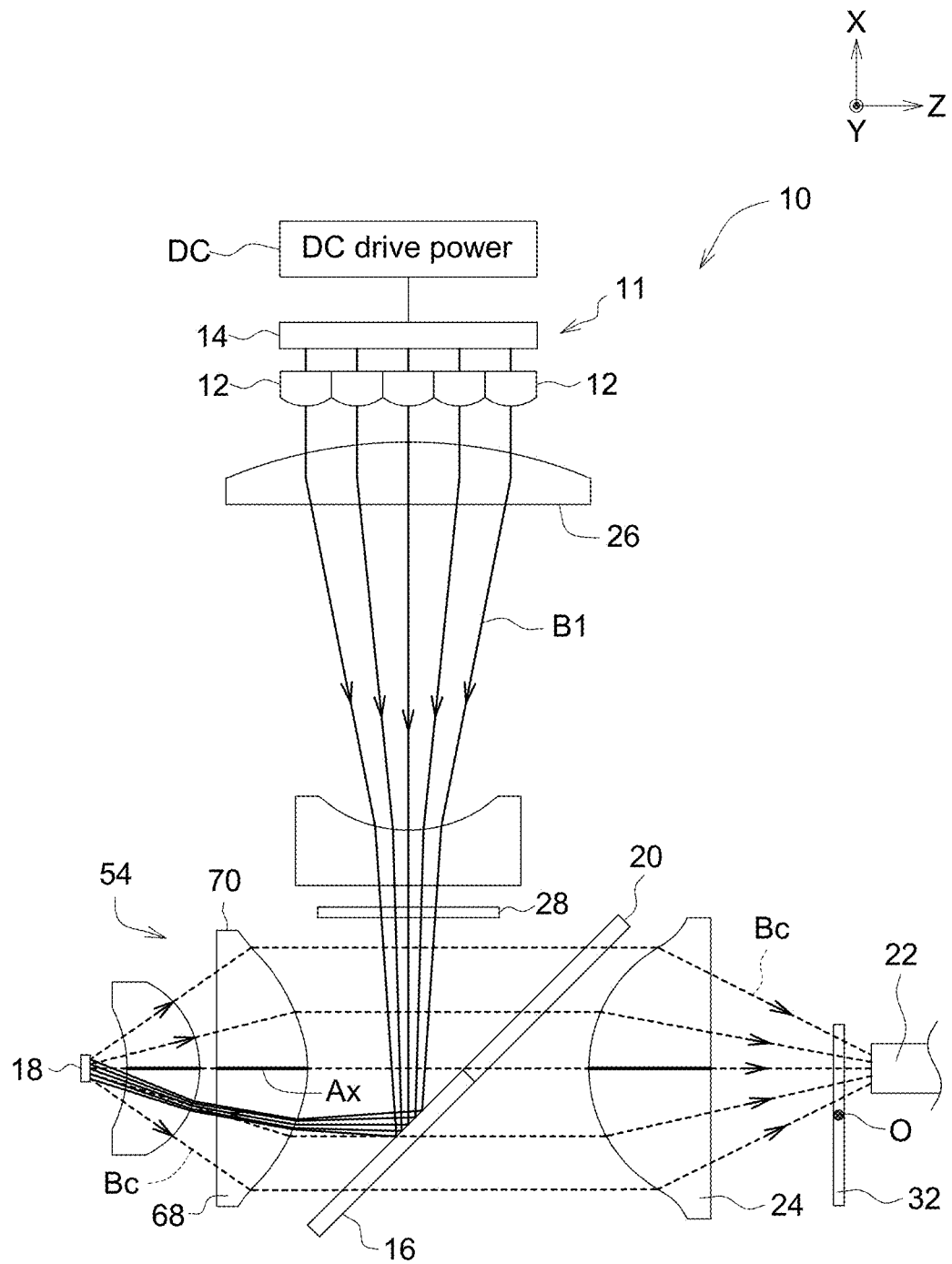
FIGS. 5A-5C respectively are schematic diagrams of a projection device according to an embodiment of the present invention.
Figure 5B:
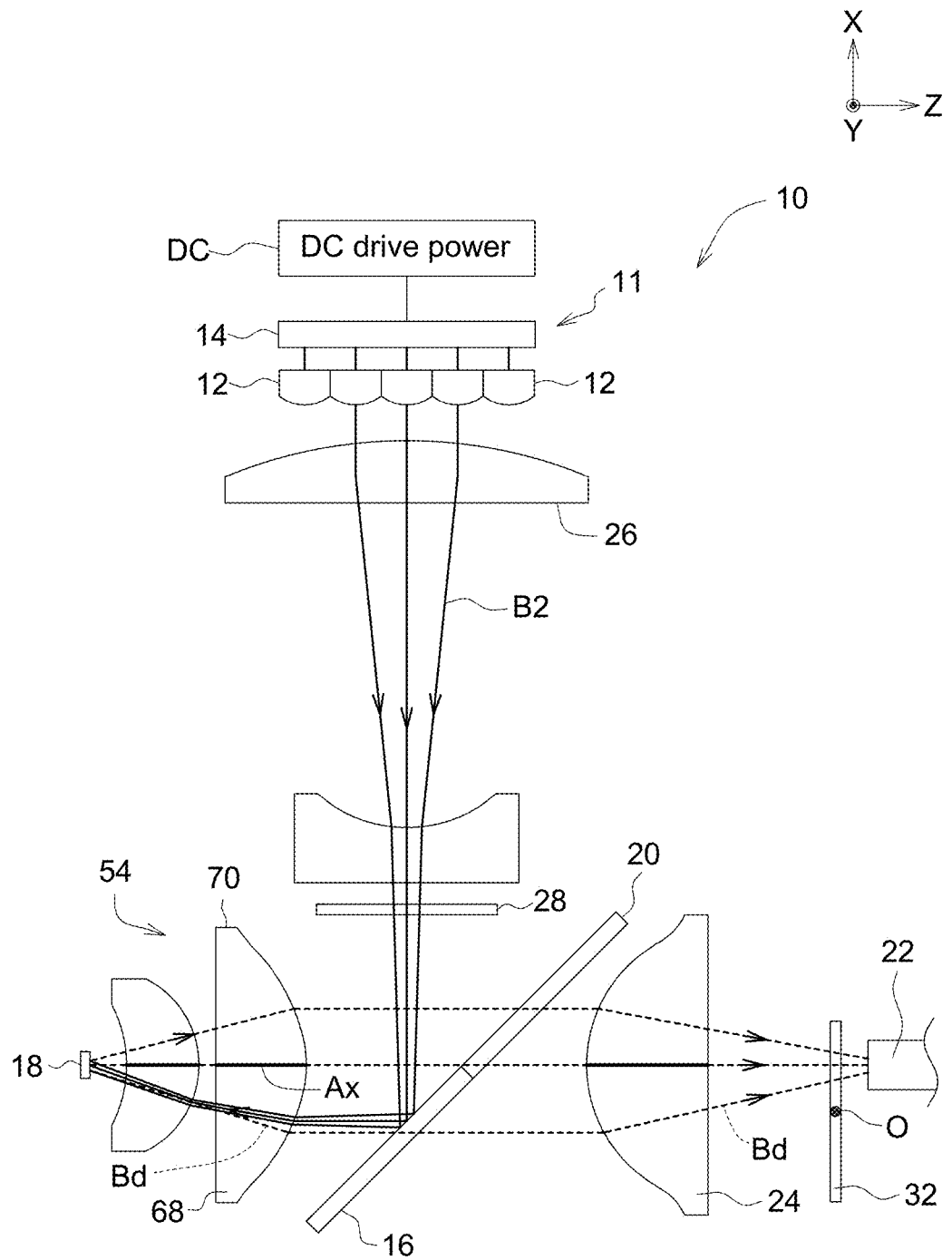
Figure 5C:
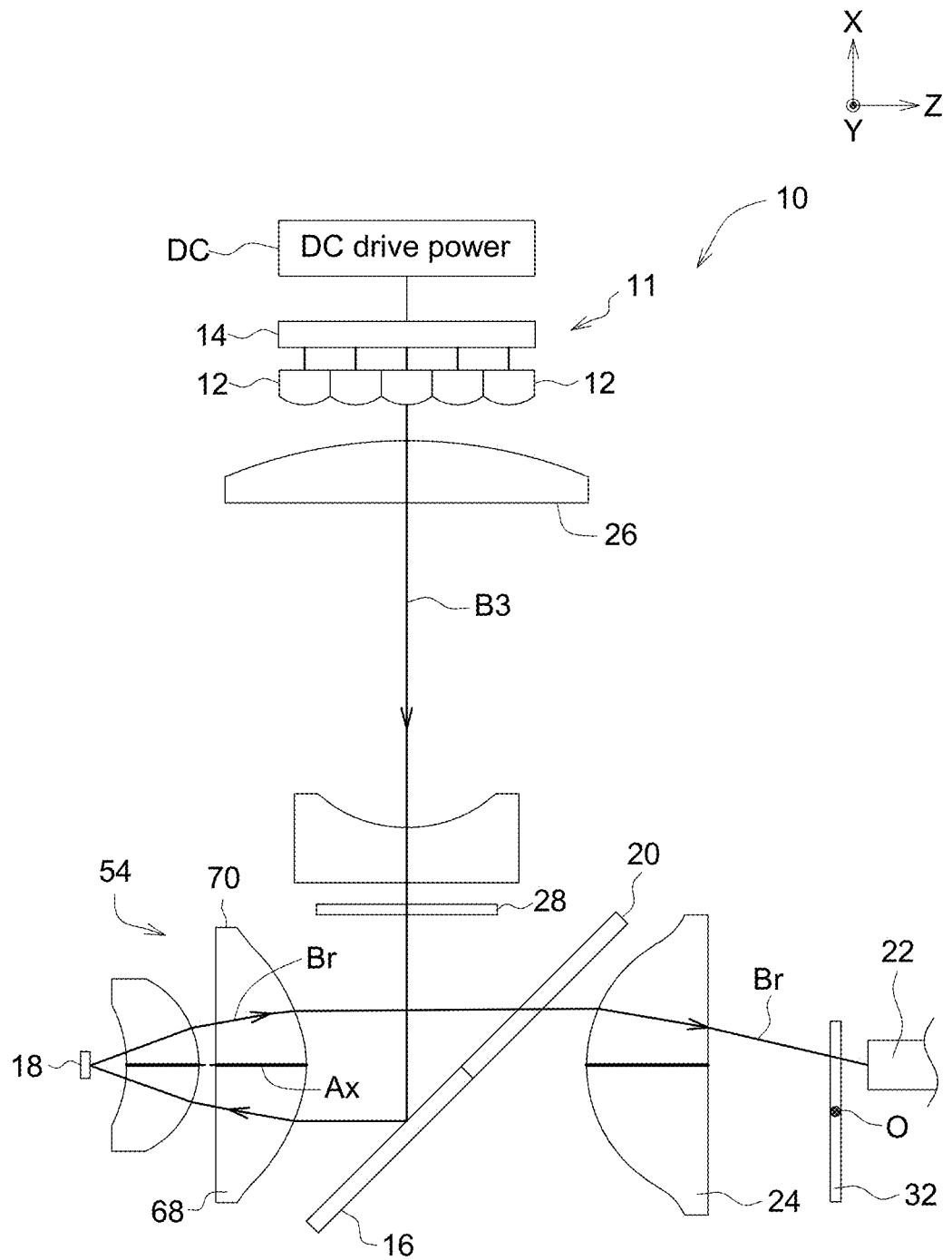

Referring to FIGS. 5A-5C, schematic diagrams of a projection device 10 according to an embodiment of the present invention are respectively shown. In FIGS. 5A-5C, the arrangement of elements is identical except that the light source module 11 turns on different numbers of light sources to generate different light outputs.

The projection device 10 includes a light source module 11, a color wheel 32, a wavelength conversion module 18 and a light splitting element 16. The light source module 11 sequentially emits a first light B1 (referring to FIG. 5A), a second light B2 (referring to FIG. 5B) and a third light B3 (referring to FIG. 5C). The wavelength conversion module 18, disposed at the downstream of the light source module 11, sequentially receives the first light B1, the second light B2 and the third light B3 to correspondingly generate a first excited beam Bc, a second excited beam Bd and a reflective beam Br. Besides, the light splitting element 16, disposed at the downstream of the light source module 11, reflects the first light B1, the second light B2 and the third light B3 to the wavelength conversion module 18, and allows the excited beams Bc and Bd to penetrate. The color wheel 32 is disposed at the downstream of the light source module 11, the wavelength conversion module 18 and the light splitting element 16, wherein the first block W1, the second block W2 and the third block W3 of the color wheel 32 correspondingly receive the first light B1, the second light B2 and the third light B3, so that the projection device sequentially outputs the first color light R, the second color light G and the third color light B.

The first excited beam Bc and the second excited beam Bd are such as yellow lights; the first light B1, the second light B2, the third light B3 and the reflective beam Br are such as blue lights, but the present invention does not have specific restrictions regarding the said arrangement.

As indicated in FIG. 5A, the projection device 10 may further include a collimating lens 54, a light penetration part 20, a light guide tube 22, a first focusing lens 24, a second focusing lens 26 and a diffuser 28, wherein at least a part of the above elements is optional. To put it in greater details, the second focusing lens 26 is set on the illumination path of the light source module 11 for converging the first light B1 projected towards the light splitting element 16. The diffuser 28 is disposed between the light source module 11 and the light splitting element 16 for diffusing the first light B1, so that the light intensity of the light spots formed by the first light B1 can be uniformly distributed within their ranges. The light splitting element 16 reflects the first light B1 to the collimating lens 54, which can be divided into a first part [30] 68 and a second part [32] 70, wherein the first part 68 and the second part 70 are separated by the center axis Ax. The light splitting element 16 is opposite to the first part 68, and therefore can reflect the first light B1 to the first part [30] 68 of the collimating lens 54.

The wavelength conversion module 18 and the light splitting element 16 are respectively disposed on two opposite sides of the collimating lens 54. The first light B1 penetrates the first part 68 of the collimating lens 54 then irradiates on the wavelength conversion module 18. The wavelength conversion module 18 receives the first light B1 from the first part 68 then reflects the first light B1 to the second part 70 and generates a first excited beam Bc, which can concurrently penetrate the first part 68 and the second part 70. After penetrating the collimating lens 54, the first excited beam Bc proceeds to the light splitting element 16 and the light penetration part 20. The light guide tube 22 is disposed on one side of the light splitting element 16 different from the other side on which the collimating lens 54 and the wavelength conversion module 18 are disposed. The first focusing lens 24 is disposed between the light splitting element 16 and the light guide tube 22 for converging the first excited beam Bc which penetrates the first part 68 and the second part 70. The color wheel 32 is disposed between the first focusing lens 24 and the light guide tube 22, so that the first color light R penetrates the first block W1 of the color wheel 32 can enters the light guide tube 22. The light guide tube 22 receives the first color light R from the color wheel 32, then guides the first color light R to other parts.

In the present embodiment, the light penetration part 20 allows the light beams within all wavelength ranges to penetrate. For instance, if the first light B1 is a blue light (with a wavelength of about 450-495 nm), the first light B1 is reflected to the wavelength conversion module 18 by the light splitting element 16. When the wavelength conversion module 18 is irradiated by the first light B1, the wavelength conversion module 18 generates a first excited beam Bc. The first excited beam Bc is a yellow light (with a wavelength of about 570-590 nm) and can concurrently penetrate the light splitting element 16 and the light penetration part 20. The first block W1 of the color wheel 32 allows a first waveband of the first excited beam Bc (such as the red light waveband) to penetrate, and the remaining wavebands are blocked and cannot pass through the color wheel 32 to generate the first color light R (such as a red light). That is, the first waveband corresponds to the waveband of the first color light R. It should be understood that in the present embodiment, the light penetration part 20 also can be omitted.

Similarly, in FIG. 5B, when the light source module 11 emits a second light B2, the wavelength conversion module 18 is irradiated by the second light B2 and generates a second excited beam Bd, such as a yellow light (with a wavelength of about 570-590 nm). The second excited beam Bd can concurrently penetrate the light splitting element 16 and the light penetration part 20. The second block W2 of the color wheel 32 allows a second waveband of the second excited beam Bd (such as the green light waveband) to penetrate, and the remaining wavebands are blocked and cannot pass through the color wheel to generate the second color light G (such as green light). That is, the second waveband corresponds to the waveband of the second color light G.

As indicated in FIG. 5C, when the light source module 11 emits a third light B3, the wavelength conversion module 18 is irradiated by the third light B3 and generates a reflective beam Br, such as a blue light (with a wavelength of about 570-590 nm). The reflective beam Br only passes through the second part 32 and penetrates the light penetration part 20. The third block W3 of the color wheel 32 allows a third waveband of the reflective beam Br (such as the blue light waveband) to penetrate, and the remaining wavebands are blocked and cannot pass through the color wheel to generate the third color light B (such as the blue light). That is, the third waveband corresponds to the waveband of the third color light B.

In the present embodiment, the wavelength conversion module 18 is a rotatable fluorescent Laser color wheel, including a first segment formed of disc-shaped reflective material (such as an aluminum disc) and a second segment with a wavelength conversion coating (such as a C-shaped ring). The first segment is such as at the notch of a C-shaped ring. When the first light B1 irradiates on the second segment of the wavelength conversion module 18, which rotates at a high speed, the second segment converts the first light B1 to a first excited beam Bc. When the second light B2 irradiates on the second segment of the wavelength conversion module 18, which rotates at a high speed, the second segment converts the second light B2 to a second excited beam Bd. When the third light B3 irradiates on the first segment of the wavelength conversion module 18, the first segment converts the third light B3 to a reflective beam Br. Thus, the first excited beam Bc, the second excited beam Bd and the reflective beam Br can be converged by the first focusing lens 24 and sequentially enter the color wheel 32, then the light guide tube 22 guides the color lights to other parts.

Figure 6A:
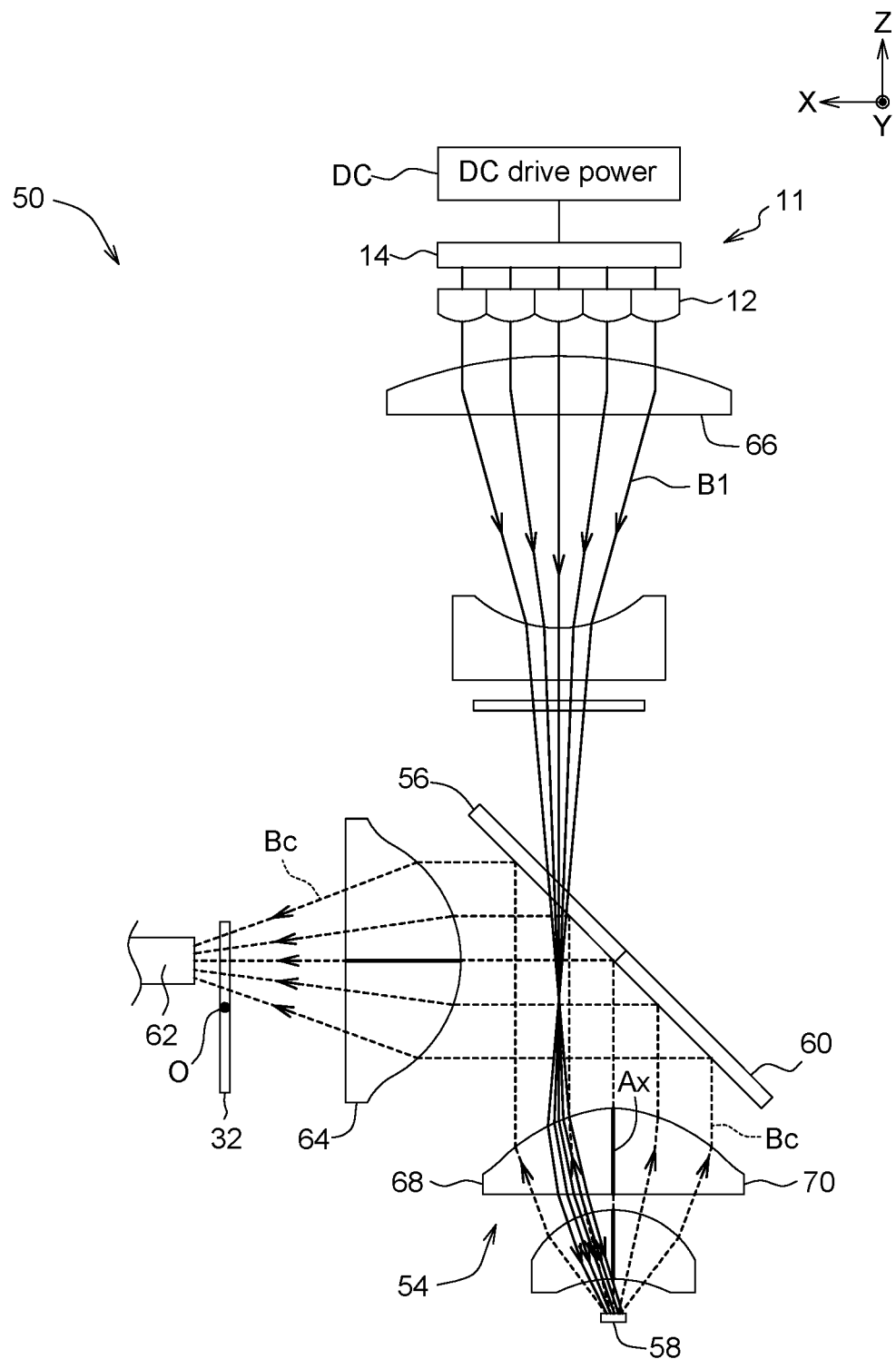
FIGS. 6A-6C respectively are schematic diagrams of a projection device according to another embodiment of the present invention.
Figure 6B:
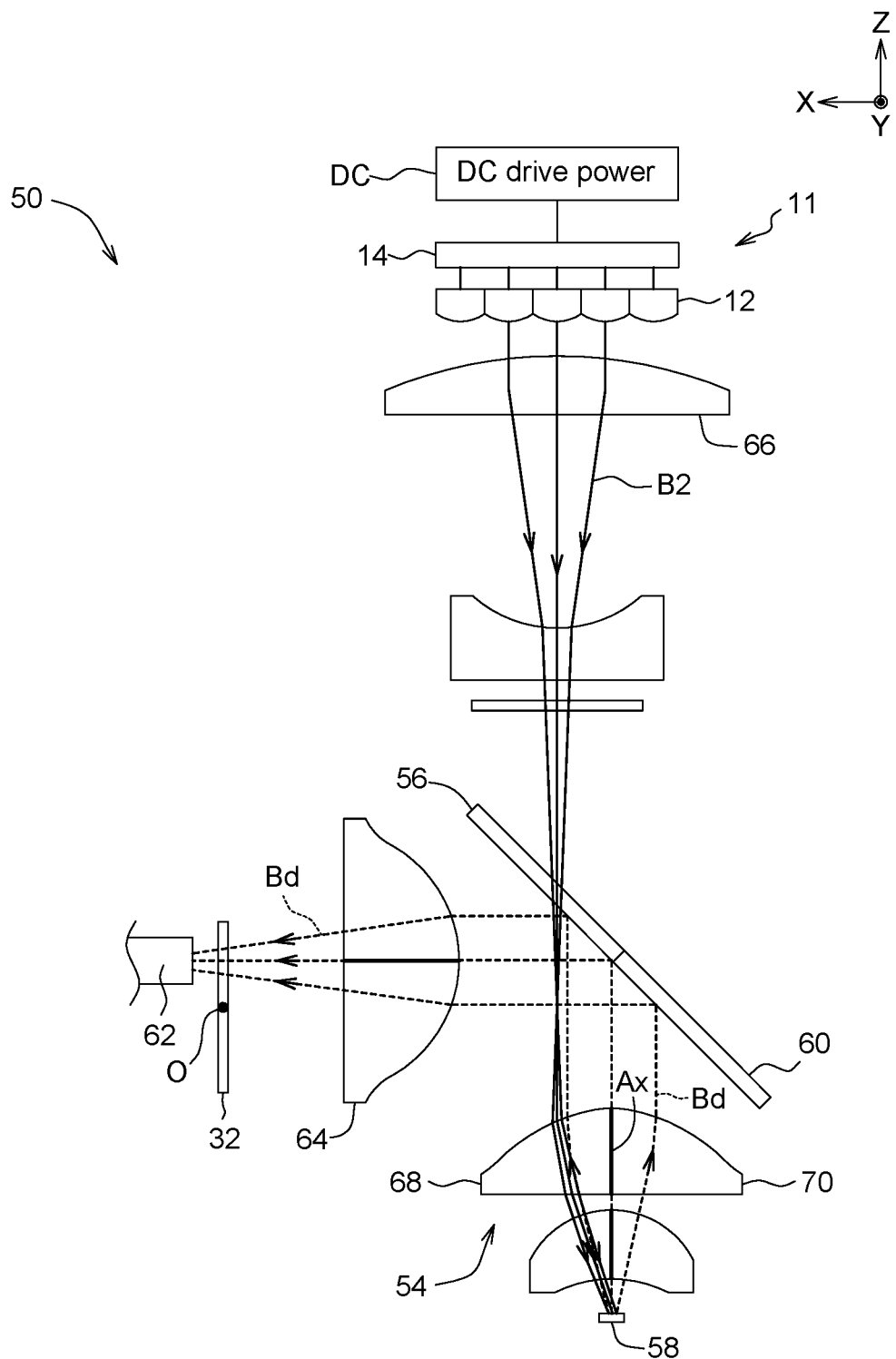
Figure 6C:
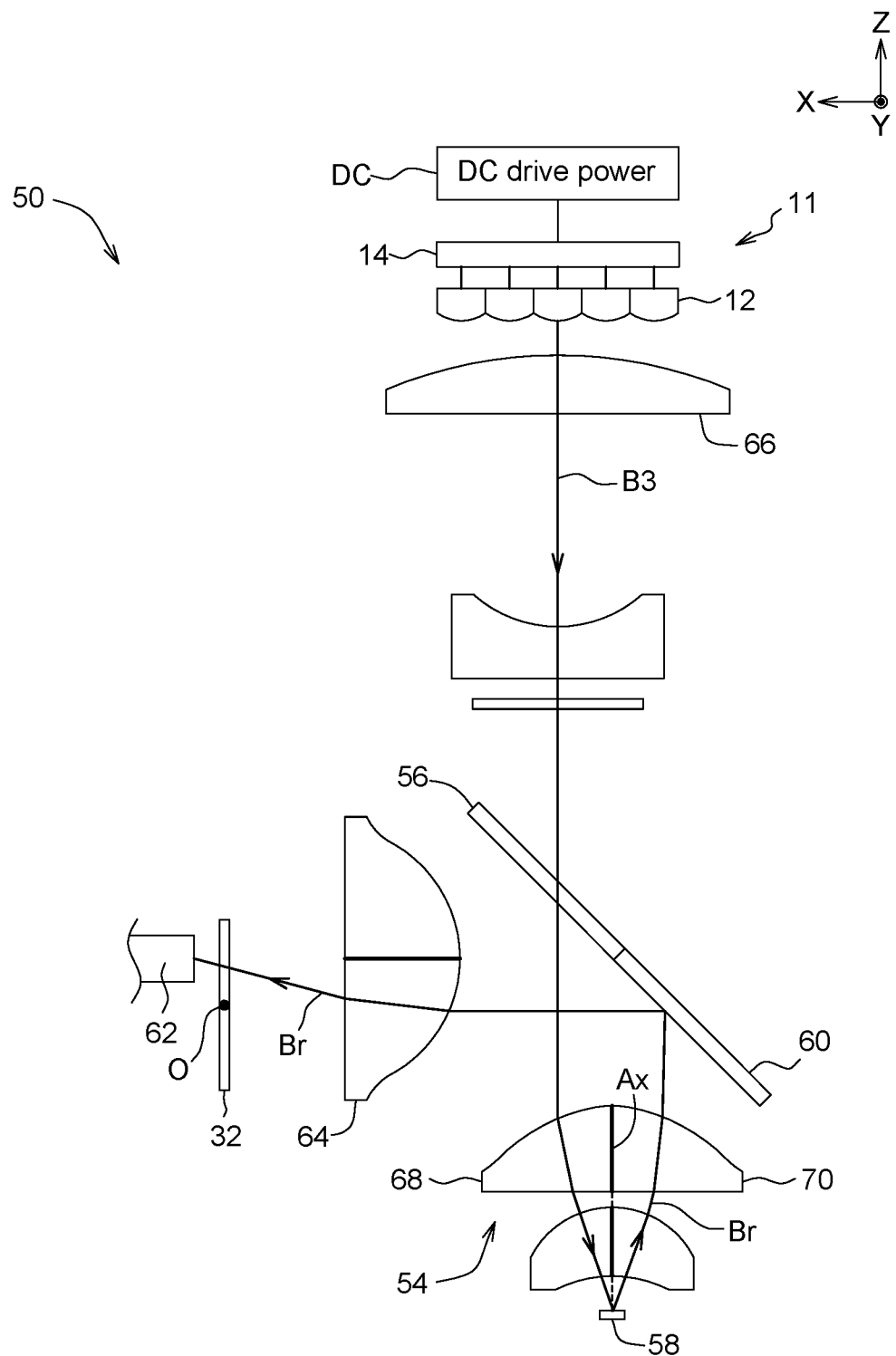

Referring to FIGS. 6A-6C, schematic diagrams of a projection device 50 according to another embodiment of the present invention are respectively shown. In FIG. 6A to FIG. 6C, the arrangement of elements is identical except that the light source module 11 turns on different numbers of light sources to generate different light outputs.

The projection device 50 of the present embodiment is different from the projection device of the above embodiment in that the projection device 50 includes a light source module 11, a color wheel 32, a collimating lens 54, a light splitting element 56, a wavelength conversion module 58, a first reflective element 60, a light guide tube 62, a first focusing lens 64 and a second focusing lens 66. The second focusing lens 66 is disposed between the light source module 11 and the light splitting element 56. The wavelength conversion module 58 is disposed on one side of the light splitting element 56 different from the other side on which the light source module 11 is disposed. The collimating lens 54 is interposed between the light splitting element 56 and the wavelength conversion module 58. The collimating lens 54 has a first part 68 and a second part 70; the light splitting element 56 is opposite to the first part 68; the first reflective element 60 is connected to the light splitting element 56 and opposite to the second part 70. The light guide tube 62 and the wavelength conversion module 58 are disposed on the same top or left side of the light splitting element 56. The color wheel 32 is disposed between the first focusing lens 64 and the light guide tube 62. The light splitting element 56 allows the color light within a specific wavelength range (such as the blue light) to penetrate, and reflects the color light within other wavelength ranges (such as the yellow light).

As indicated in FIG. 6A, the light source module 11 provides a first light B1, which is converged by the second focusing lens 66 and is projected on the light splitting element 56. The light splitting element 56 allows the first light B1 to penetrate. The first light B1 sequentially penetrates the light splitting element 56 and the first part 68 of the collimating lens 54 to reach the wavelength conversion module 58. The wavelength conversion module 58 is irradiated by the first light B1 and generates a first excited beam Bc, which penetrates the first part 68 and the second part 70 of the collimating lens 54 then proceeds to the light splitting element 56 and the first reflective element 60. The first reflective element 60 and the light splitting element 56 reflect the first excited beam Bc, which is converged by the first focusing lens 64 then is projected on the color wheel 32 and proceeds to the light guide tube 62. The first block W1 of the color wheel 32 allows a first waveband of the first excited beam Bc (such as red light waveband) to penetrate, and the remaining wavebands are blocked and cannot pass through the color wheel to generate the first color light R (such as red light). That is, the first waveband corresponds to the waveband of the first color light R.

Similarly, in FIG. 6B, when the light source module 11 emits a second light B2, the wavelength conversion module 58 of FIG. 6B is irradiated by the second light B2 to generate a second excited beam Bd, such as a yellow light (with a wavelength of about 570-590 nm). The first reflective element 60 and the light splitting element 56 reflect the second excited beam Bd. The second excited beam Bd is converged by the first focusing lens 64, and then is projected on the color wheel 32 and proceeds to the light guide tube 62. The second block W2 of the color wheel 32 allows a second waveband of the second excited beam Bd (such as green light waveband) to penetrate, and the remaining wavebands are blocked and cannot pass through the color wheel to generate the second color light G (such as green light). That is, the second waveband corresponds to the waveband of the second color light G.

As indicated in FIG. 6C, when the light source module 11 emits a third light B3, the wavelength conversion module 58 of FIG. 6C is irradiated by the third light B3 and generates a reflective beam Br, such as a blue light (with a wavelength of about 570-590 nm). The reflective beam Br only passes through the second part 70 then is reflected to the first focusing lens 64 by the first reflective element 60. The third block W3 of the color wheel 32 allows a third waveband of the reflective beam Br (such as the blue light waveband) to penetrate, and the remaining wavebands are blocked and cannot pass through the color wheel to generate the third color light B (such as blue light). That is, the third waveband corresponds to the waveband of the third color light B.

Thus, the first excited beam Bc, the second excited beam Bd and reflective beam Br can be converged by the first focusing lens 64 and sequentially enter the color wheel 32, then the light guide tube 62 guides the color lights to other parts. In the present embodiment, the wavelength conversion module 68 can be realized by a rotatable fluorescent excited color wheel having a C-shaped ring with a wavelength conversion coating. The structure of the wavelength conversion module 68 is similar to that of the wavelength conversion module 18, and the similarities are not repeated here.

According to the projection device disclosed in above embodiments of the present invention, solid-state lighting sources are driven by a DC drive power, and a predetermined amount of light can be generated by adjusting the number of turned-on light sources of the solid-state lighting sources. Since the light source module does not need to change the drive current at a faster speed when the pulse width of the control circuit is narrowed, the design difficulty of the control circuit can be reduced without increasing the load and cost of the control circuit.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projection device, comprising:
    a drive circuit configured to provide direct-current (DC) power;
    a light source module powered by the drive circuit, comprising a plurality of solid-state lighting sources driven by the DC power to sequentially provide a first light generated by a first number of light sources, a second light generated by a second number of light sources, and a third light generated by a third number of light sources, wherein at least one of the first, second and third numbers of light sources is less than or equal to a total number of the solid-state lighting sources; and
    a color wheel, having a first block configured to receive the first light and output a first color with a first brightness, a second block configured to receive the second light and output a second color with a second brightness, and a third block configured to receive the third light and output a third color light with a third brightness, wherein the driver circuit is further configured to power the light source module in a first lighting mode and a second lighting mode, the numbers of light sources to be turned on in the first lighting mode is different from the number of light sources to be turned on in the second lighting mode.

2. The projection device according to claim 1, wherein the solid-state lighting sources are a Laser array or a light-emitting diode array.

3. The projection device according to claim 1, wherein the first lighting mode is a highlight mode, the second lighting mode is a high color mode, and the brightness of at least one of the first, second, and third color lights in the first lighting mode is not the same as in the second lighting mode.

4. The projection device according to claim 3, wherein the high color mode has a first modulation parameter and a second modulation parameter, and a light output of at least one of the first, second, and third color lights in the first modulation parameter is not the same as in the second modulation parameter.

5. The projection device according to claim 1, further comprising a wavelength conversion module disposed downstream of the light source module, wherein the wavelength conversion module sequentially receives the first light, the second light and the third light to correspondingly generate a first excited beam, a second excited beam and a reflective beam.

6. The projection device according to claim 5, further comprising a light splitting element disposed downstream of the light source module, wherein the light splitting element reflects the first light, the second light and the third light to the wavelength conversion module, and the light splitting element allows the first and second excited beams to penetrate.

7. The projection device according to claim 5, further comprising a light splitting element disposed downstream of the light source module, wherein the light splitting element allows the first light, the second light and the third light to penetrate and enter the wavelength conversion module, and the light splitting element reflects the first and second excited beams.

8. The projection device according to claim 5, wherein the lights and the reflective beam are blue color lights, and the first and second excited beams are yellow color lights.

9. The projection device according to claim 5, wherein the first block allows a first waveband of the first excited beam to pass through, the second block allows a second waveband of the second excited beam to pass through, and the third block allows a third waveband of the reflective beam to pass through.

10. The projection device according to claim 9, wherein the first waveband corresponds to a waveband of the first color light, the second waveband corresponds to a waveband of the second color light, and the third waveband corresponds to a waveband of the third color light.

11. The projection device according to claim 1, wherein the solid-state lighting sources further provide a fourth light generated by a fourth number of light sources, and the color wheel further has a fourth block corresponding to the fourth light, so that the projection device outputs a fourth color light with a fourth brightness.

12. The projection device according to claim 11, wherein each area of the blocks is positively correlated with the light output of corresponding color light.

13. The projection device according to claim 11, wherein each brightness of the first, second, third and fourth color lights is positively correlated with the number of corresponding light sources to be turned on.

14. The projection device according to claim 11, wherein the first color light is a red light, the second color light is a green light, the third color light is a blue light, and the fourth color light is a yellow light.

15. The projection device according to claim 11, wherein n groups of the light sources are set, and each group of the light sources has a predetermined number of light-emitting devices, wherein n is a positive number.

16. The projection device according to claim 15, wherein at least one of the n groups of the light sources is turned on to form the first number of light sources, the second number of light sources or the third number of light sources.

17. The projection device according to claim 15, wherein each group of the light sources is driven by a current having a fixed value.

18. The projection device according to claim 15, wherein the drive circuit is connected to the n groups of the light sources respectively for controlling ON/OFF state of the n groups of the light sources according to the number of light sources to be turned on.

19. A projection device, comprising:
a drive circuit configured to provide direct-current (DC) power;
a light source module powered by the drive circuit, comprising a plurality of solid-state lighting sources driven by the DC power to sequentially provide a first light generated by a first number of light sources, a second light generated by a second number of light sources, and a third light generated by a third number of light sources, wherein at least one of the first, second and third numbers of light sources is less than or equal to a total number of the solid-state lighting sources; and
a color wheel, having a first block configured to receive the first light and output a first color with a first brightness, a second block configured to receive the second light and output a second color with a second brightness, and a third block configured to receive the third light and output a third color light with a third brightness, wherein the driver circuit outputs a drive current having a fixed value.

* * * * *